United States Patent
Nystrom

(10) Patent No.: US 10,349,081 B2
(45) Date of Patent: Jul. 9, 2019

(54) METHOD AND DEVICE FOR REAL-TIME ENCODING

(71) Applicant: Axis AB, Lund (SE)

(72) Inventor: Johan Nystrom, Vellinge (SE)

(73) Assignee: Axis AB, Lund (SE)

( * ) Notice: Subject to any disclaimer, the term of this patent is extended or adjusted under 35 U.S.C. 154(b) by 130 days.

(21) Appl. No.: 14/958,346

(22) Filed: Dec. 3, 2015

(65) Prior Publication Data

US 2016/0165261 A1    Jun. 9, 2016

(30) Foreign Application Priority Data

Dec. 5, 2014  (EP) ..................................... 14196459

(51) Int. Cl.

| | | |
|---|---|---|
| *H04N 19/593* | (2014.01) | |
| *G08B 13/24* | (2006.01) | |
| *H04N 19/114* | (2014.01) | |
| *H04N 19/137* | (2014.01) | |
| *H04N 19/177* | (2014.01) | |
| *H04N 19/527* | (2014.01) | |

(52) U.S. Cl.

CPC ....... *H04N 19/593* (2014.11); *G08B 13/2497* (2013.01); *H04N 19/114* (2014.11); *H04N 19/137* (2014.11); *H04N 19/177* (2014.11); *H04N 19/527* (2014.11)

(58) Field of Classification Search

CPC ... H04N 19/114; H04N 19/137; H04N 19/177
See application file for complete search history.

(56) References Cited

U.S. PATENT DOCUMENTS

| 9,071,814 B1* | 6/2015 | Fan ...................... H04N 19/177 |
|---|---|---|
| 2003/0174775 A1 | 9/2003 | Nagaya et al. |
| 2006/0083299 A1 | 4/2006 | Kitajima |
| 2006/0126735 A1 | 6/2006 | Tanaka |
| 2010/0039536 A1 | 2/2010 | Dahllof et al. |
| 2013/0003845 A1* | 1/2013 | Zhou ..................... H04N 19/197 |
| | | 375/240.16 |
| 2014/0051921 A1* | 2/2014 | Miller ................. A61B 1/00009 |
| | | 600/103 |
| 2014/0198851 A1* | 7/2014 | Zhao ..................... H04N 19/142 |
| | | 375/240.16 |

FOREIGN PATENT DOCUMENTS

| JP | 2004039332 A2 | 2/2004 |
|---|---|---|
| JP | 2004180345 A2 | 6/2004 |

OTHER PUBLICATIONS

EP 14 19 6459.3 European Search Report (dated Apr. 14, 2015).
Scene-Context-Dependent Reference-Frame Placement for MPEG Video Coding; Lan et al.; IEEE Transactions on Circuits and Systems for Video Technology; vol. 9, No. 3, Apr. 1999.

* cited by examiner

*Primary Examiner* — Mainul Hasan
(74) *Attorney, Agent, or Firm* — Volpe and Koenig, P.C.

(57) ABSTRACT

The present invention relates to a method, an encoder, a computer program product, and a system for real-time encoding. The encoder is arranged to receive movement information about a movement of a camera, the encoder being arranged to encode, in real-time, a video stream acquired by the camera during the movement of the camera, wherein the encoder is arranged to encode based on said movement information. The movement information may be stored in a memory.

17 Claims, 6 Drawing Sheets

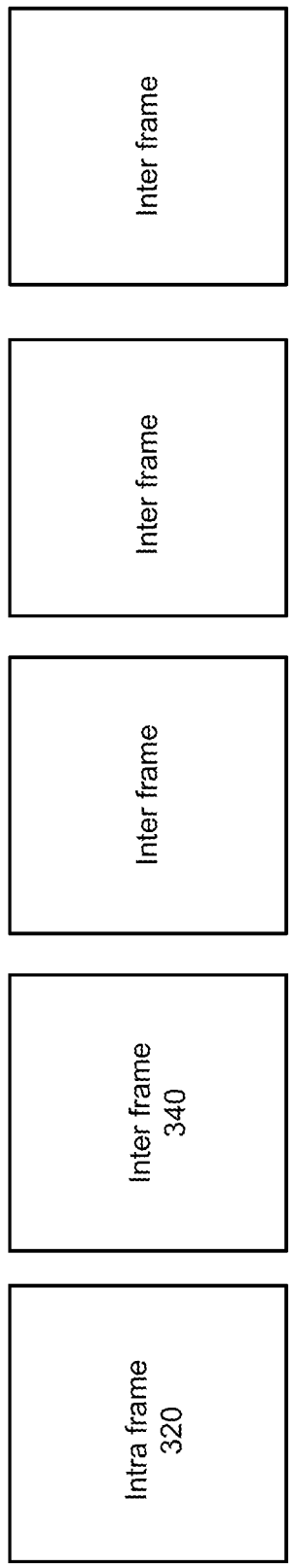
Fig. 3a
Fig. 3b

METHOD AND DEVICE FOR REAL-TIME ENCODING

FIELD OF INVENTION

The present invention relates to a method, an encoder, a computer program product, and a system for real-time encoding.

BACKGROUND

Digital video systems generally communicate a sequence of digital images from a source, such as a camera, to a destination, such as a display. The communication can be directly from a camera to a live display or the communication can be time delayed by storing the video and displaying it at a later time. The digital images may be compressed or communicated in their native format.

A problem with real-time encoding is that it is difficult to plan usage of bit rate over time since one does not have information about the future. Bursts in the communication, i.e. peaks of high bit rate in the transmission of the digital images from the source to the destination can occur and be difficult to foresee. There is thus a need for methods for encoding video in real-time that enable planning of use of bit rate.

SUMMARY

In view of the above, an objective of the invention is to solve or at least reduce one or several of the drawbacks discussed above. Generally, the above objective is achieved by the attached independent patent claims.

According to a first aspect, the present invention is realized by a method for real-time encoding, comprising: receiving movement information about a movement of a camera, and encoding, in real-time, a video stream acquired by the camera during the movement of the camera, wherein the encoding is performed based on said movement information.

Thus, encoding in real-time is achieved by using movement information of the camera. As an example, if the movement has a high velocity, a lot of movement can be expected in the video stream which increases the bit rate. By taking into account of this information, the encoding can be adjusted, e.g., by storing less or more information from the acquired video stream, as will be described in the embodiments below.

It is very advantageous to encode a video stream in real-time this way since it enables planning of bit rates of the video stream and peaks of high bit rate can be avoided. Furthermore, a better image quality can be achieved when this is desirable.

The movement may comprise at least one from the group of a pan operation, a tilt operation, a zoom operation, and a focus operation of the camera.

The step of encoding may comprise adjusting a ratio of inter frames to intra frames based on said movement information. The encoding can hence be adapted to different situations benefiting from different encodings. The number of frames in an encoded video sequence is determined by the length of the video sequence and by the frame rate. Thus, if the ratio of inter frames to intra frames is adjusted by increasing the number of one of the types of frames, then the number of the other type has to be decreased.

The step of encoding may comprise adjusting said ratio by reducing a number of intra frames at least during the movement. This may be advantageous, e.g., in cases in which the information that can be acquired during movement of the camera is not that interesting. Hence, it is good enough to have a poor image quality (due to the reduced number of intra frames) during the movement. Then the bit rate during the movement is smaller and, also, peaks of high bit rate can be avoided. This embodiment may, e.g., also be applicable when the movement is relatively quick. The step of adjusting said ratio by reducing a number of intra frames at least during the movement, may be performed if the time between the end time and the start time of the movement is smaller than a predetermined level.

The step of adjusting may comprise encoding using only inter frames at least during the movement. Using only inter frames during the movement may further reduce the bit rate.

The step of encoding may comprise adjusting said ratio by increasing a number of intra frames during the movement. This may be advantageous in embodiments wherein the images that are acquired during the movement of the camera may comprise interesting information. In one embodiment, the method may further comprise the step of comparing the bit rate with the time between the start time and the end time. Thus, it may be concluded that since the time between the start time and the end time is relatively short, the extra bit rate that is required when increasing a number of intra frames during the movement can be endured since a bandwidth budget allows it. Transmission capacity is determined by the available bandwidth and therefore it might be advantageous to plan the usage of bandwidth. The planning might include deciding to use more bandwidth temporarily since the plan takes into account that in a while, less bandwidth will be required.

The movement may be a predetermined movement. The method may further comprise: retrieving predetermined information relating to the predetermined movement, and encoding the video stream based on said predetermined information. This may be advantageous in embodiments in which the camera is setup having a predetermined guard tour. In such embodiments, the camera may be preprogrammed into moving to predetermined positions in predetermined points in time.

According to a second aspect, the present invention is realized by a computer program product comprising a computer-readable storage medium with instructions adapted to carry out the method according to the first aspect when executed by a device having processing capability.

According to a third aspect, the present invention is realized by an encoder for real-time encoding, comprising: the encoder being arranged to receive movement information about a movement of a camera, the encoder being arranged to encode, in real-time, a video stream acquired by the camera during the movement of the camera, wherein the encoder is arranged to encode based on said movement information.

Said movement information may comprise a start time and an end time of the movement.

The movement may comprise at least one from the group of a pan operation, a tilt operation, a zoom operation, and a focus operation of the camera.

The encoder may be arranged to adjust a ratio of inter frames to intra frames based on said movement information.

The encoder may be arranged to adjust said ratio by reducing a number of intra frames at least during the movement.

The encoder may be arranged to adjust by using only inter frames at least during the movement.

The encoder may be arranged to adjust said ratio by increasing a number of intra frames during the movement.

The movement may be a predetermined movement, the device may further comprise: the encoder being arranged to retrieve predetermined information relating to the predetermined movement, and the encoder being arranged to encode the video stream based on said predetermined information.

According to a fourth aspect, the present invention is realized by a digital video camera comprising the encoder of the third aspect, wherein the video stream is acquired by the digital video camera.

According to a fifth aspect, the present invention is realized by a system comprising a camera and an encoder according to the third aspect. The system further comprises: a first digital network module configured to transmit the encoded video stream via digital network, a second digital network module configured to receive the encoded video stream via the digital network, a decoder configured to decode the encoded video stream into a second video stream, and a client comprising: a display configured to display the second video stream.

The advantages of the first aspect are equally applicable to the second, third, fourth, and fifth aspect.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which FIG. 3a is a schematic illustration of an encoded video stream, FIG. 3b is a schematic illustration of an encoded video stream.

DETAILED DESCRIPTION OF THE PREFERRED EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

A digital image is represented by pixels. Each pixel is represented by a plurality of values defining the appearance of the pixel. Depending on the image processing scheme used for the image, these values may represent different features of the pixel. In some schemes, a pixel is represented by three color values, e.g. RGB, CMY, etc. In other schemes, a pixel is represented by two color values and one light intensity value, e.g. YCbCr. The YCbCr format is a common format used in video compression algorithms.

A motion video is formed as a sequence of image frames. Each image frame is captured using some type of image sensor and then the analog data from each captured image frame is converted on the fly to digital image data represented in any known way, e.g. one of the representations presented above.

In the presently described process for motion video encoding each image frame may be represented by a full size image frame F. This full size image frame F may later in the process be compressed using a video codec, e.g. 11.265 based, 11.264 based, H. 263 based, H. 262 based, Google On2 codecs, Windows Media Video, etc.

Figure 1:
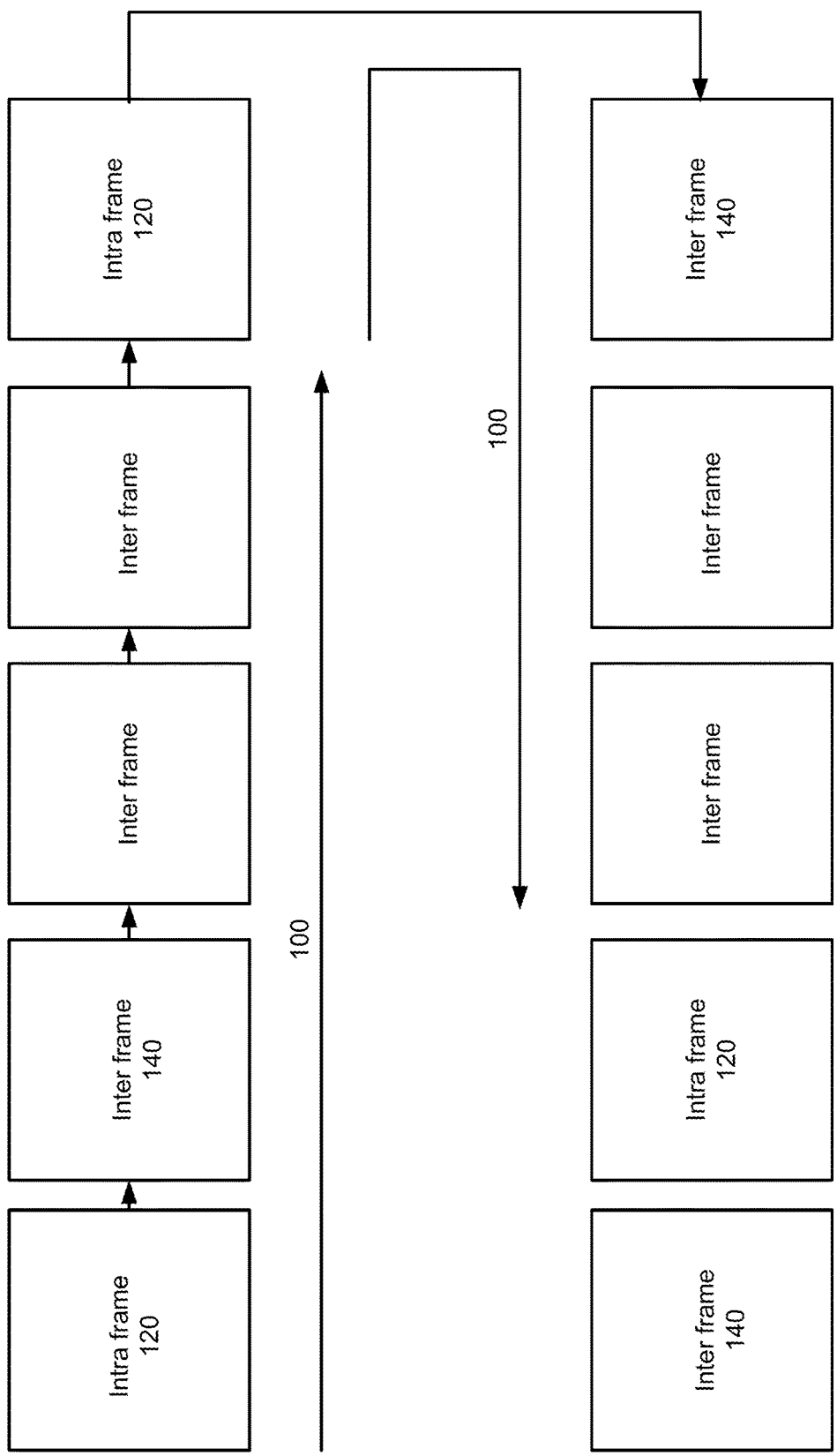
FIG. 1 is a schematic illustration of an encoded video stream, FIG. 2 describes by way of example an embodiment of the inventive method for encoding.

Moreover, the video codecs relevant for the present invention may be video codecs having temporal video compression and implementing intra frames, e.g. I-frames, and inter frames, e.g. P-frames or B-frames. An intra frame may be described as an image frame that is encoded using only the information in the image frame to be encoded. Moreover the intra frame may be calculated from all image data captured for the image frame to be encoded. Therefore, the intra frame may sometimes be referred to as a full frame. The inter frames, also referred to as predictive frames or as differential frames, may be based on information from previously encoded image frames as well as the information of the presently encoded frame, i.e. the inter frame may be described as taking advantage of temporally redundant information in previous image frames. The motion video implementing this type of codec may generate an intra frame followed by a predetermined number of inter frames and then a new intra frame followed by the same number of inter frames. The length of this sequence of an intra frame followed by a number of inter frames may be referred to as Group of Pictures length (GOP-length). FIG. 1 is a schematic illustration of an encoded video stream comprising intra frames 120 and inter frames 140, the video stream having a GOP-length denoted by 100.

Inter frames may be represented using less data than intra frames and therefore is a motion video coded using longer GOP less data intense, i.e. having less bitrate, than a motion video coded using shorter GOP. However, the inter frame is based on estimates and therefore the perceived image quality may often be worse for a motion video having longer GOP than for a motion video having shorter GOP.

The video stream resulting from the encoding may be referred to as the encoded video stream. The encoded video stream may comprise at least one intra frame and at least one inter frame. A length of a sequence comprising an intra frame followed by a number of inter frames may be referred to as Group of Pictures length (GOP-length).

Cameras may have focus, pan, tilt and/or zoom functionality. Thus, a movement of a camera may be at least one movement operation selected from the group of a pan operation, a tilt operation, a zoom operation, and/or a focus operation of the camera. A movement of the camera may comprise a plurality of such movement operations. As an example, a movement of the camera may comprise a pan operation, a zoom operation, and a focus operation. A movement of the camera can also comprise only one movement operation, such as a pan operation, a tilt operation, a zoom operation, or a focus operation. The camera may be a digital video camera.

The invention is based on the understanding that knowledge of the focus, pan, tilt and/or zoom functionality of the camera is used when encoding an image stream acquired by the camera during a movement of the camera. Such knowledge may be included in the movement information. Movement information may comprise information about how long time a movement operation takes to execute. More particularly, movement information may comprise information about velocities of movement operations, time stamps associated with the movement operations defining duration of a movement operation. Movement information is associated with a particular camera, even though movement information for different cameras may be similar.

Movement information may be stored in a nonvolatile memory. The non-volatile memory may, e.g., be a portable memory. The memory may be arranged in the inventive camera. Alternatively, the memory is connected to the inventive camera, or the inventive encoder.

Predetermined movements may also be stored in a nonvolatile memory together with time stamps. The nonvolatile memory may be arranged in the camera and/or be portable.

Encoding in real-time can be interpreted as encoding the image frames of the acquired video sequence as they are received from the camera.

The movement of the camera may start at a start time of the movement and end at an end time of the movement. The movement information may comprise the start time and the end time of the movement. The start and end time may be received before start of the movement (e.g., in the case of a predetermined movement such as in a guard tour). Alternatively, the end time of the movement may be received simultaneously with starting the movement. Furthermore, the end time of the movement may be received during the movement (e.g. due to change of plans during the movement).

Having information about the start time and the end time of the movement makes it possible to adapt the encoding accordingly. As an example, the encoding may be adapted to how long the movement is in time.

Figure 2:
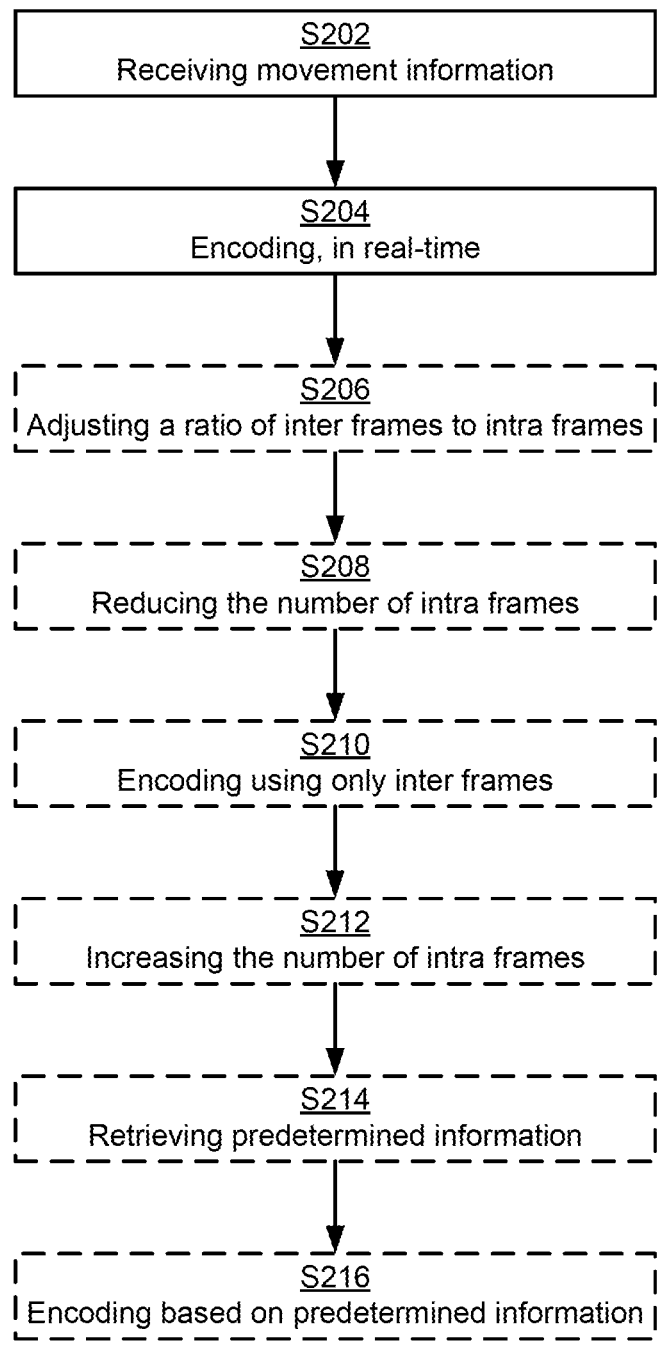

FIG. 2 describes by way of example embodiments of the inventive method 200 for real-time encoding. The first step in the method is the step of receiving S202 movement information about a movement of a camera. The next step is the step of encoding S204, in real-time, a video stream acquired by the camera during the movement of the camera, wherein the encoding is performed based on said movement information.

According to some embodiments, the method further comprises that the step of encoding comprises adjusting S106 a ratio of inter frames to intra frames based on said movement information. This can also be described as temporarily (during the movement of the camera) adjusting the GOP-length.

More particularly, the method may further comprise that the step of encoding comprises adjusting said ratio by reducing S208 a number of intra frames at least during the movement. This can also be described as temporarily (during the movement of the camera) increasing the GOP-length. This embodiment is exemplified in FIG. 3a, which is a schematic illustration of an encoded video stream comprising an intra frame 320 in the beginning of the encoded video stream, and thereafter, a plurality of inter frames 340.

During a movement the camera may be accelerated at the start time, then it travels at a relatively constant velocity, and after that the camera experiences retardation so that it ends at the end time. After the end time of the movement, there might still be some motion in the camera. To compensate for this, the encoding can be adjusted in view of the movement information also after the end time of the movement. Thus, it is therefore advantageous to adjust said ratio at least during the movement of the camera. In some embodiments, said ratio of inter frames to intra frames is only adjusted during the movement of the camera.

Figure 4:
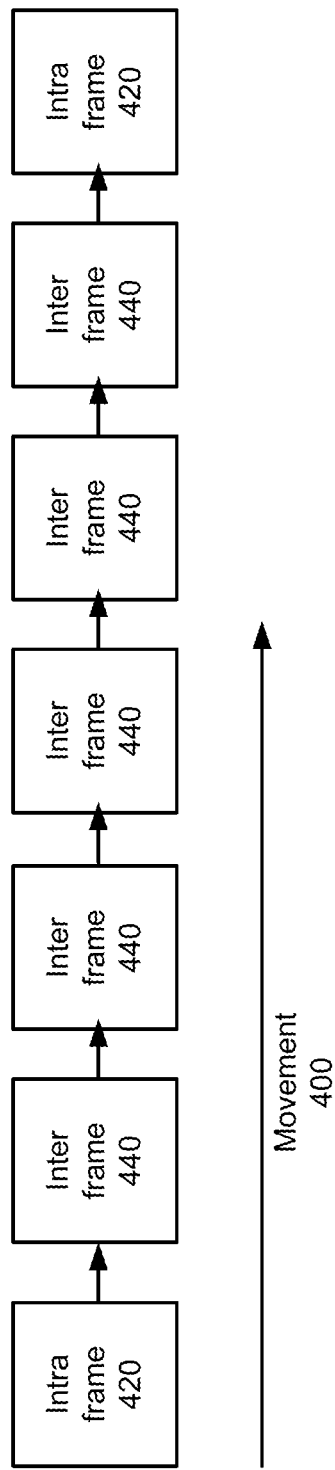
FIG. 4 is a schematic illustration of an encoded video stream.

In one embodiment, the motion can be compensated for by a fixed compensation which is the same for every movement. In some embodiments, a fixed compensation is applied both in the beginning and/or the end of the movement. The compensation can include adding at least one inter frame after an end time of the movement. In one embodiment, the video stream is encoded by adding an intra frame 420 at the beginning of the movement 400 and after that only inter frames 440 are added, see FIG. 4. Also, only inter frames 440 are added after the end time of the movement 400. The number of the inter frames added after the end time of the movement may correspond to the compensation.

In embodiments in which the images that are acquired during the movement of the camera comprise interesting information, the encoding can be adapted differently. As an example, the number of intra frames during the movement may be increased. Thus, the GOP length during the movement is decreased or even minimized. Hence, the method may further comprise that the step of adjusting comprises encoding S210 using only intra frames at least during the movement. FIG. 3b is a schematic illustration of an encoded video stream in which only intra frames 340 are used.

In one embodiment, the method may further comprise the step of evaluating the bit rate in view of the time between the start time and the end time. It may then be concluded that since the time between the start time and the end time is relatively short, the extra bit rate that is required when increasing a number of intra frames during the movement can be endured.

According to some embodiments, the method further comprises that the step of encoding comprises adjusting said ratio by increasing S212 a number of intra frames during the movement. Thus, the GOP length during the movement is decreased, or even minimized.

The movement may be a predetermined movement, and the method may further comprise the steps of retrieving S214 predetermined information relating to the predetermined movement, and encoding S216 the video stream based on said predetermined information.

The camera may be set to move in a predetermined pattern, e.g., the camera moves to point A, acquires a plurality of images, then moves to point B, acquires a plurality of images, and then moves to point C and acquires a plurality of images. Then the camera moves back to point A and acquires a plurality of images, and so on. These movements are repeated. Since the camera is preset accordingly, this movement information may be used when encoding the video stream acquired by the camera. In one example, when encoding the video stream acquired during the movement of the camera between the predetermined points, or positions, only inter frames are used when encoding the video stream. Then, when the camera reaches the position to which it is moving, at least one intra frame is used during the encoding. As an alternative, a high ratio of inter frames to intra frames is used during the movement and then, when the movement has ceased, the encoding is performed using a lower ratio of inter frames to intra frames. As a yet further alternative, a high ratio of intra frames to inter frames is used during the movement and then, when the movement has ceased, the encoding is performed using a lower ratio of intra frames to inter frames.

The camera may comprise predetermined absolute focus points. A focus operation may comprise the camera focusing in accordance with a predetermined absolute focus point. Information about focusing in accordance with a predetermined absolute focus point may be included in the movement information. After focusing in accordance with the absolute focus point, the camera may adjust the focus further. During the focusing operation, the real-time encoding may include using only inter frames or a low number of intra frames compared to the number of inter frames.

Figure 5:
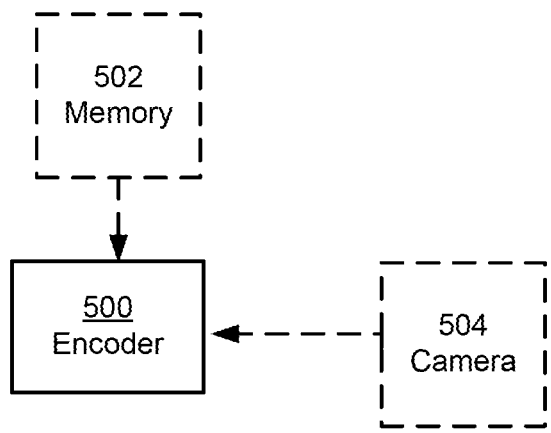
FIG. 5 is a schematic illustration of an embodiment of the inventive encoder.

FIG. 5 is a schematic illustration of an embodiment of the inventive encoder for real-time encoding. The encoder 500 is optionally connected to a camera 504, which may be a digital video camera.

The encoder 500 is optionally connected to a memory 502 which is arranged to store movement information. The memory 502 may be arranged external to the encoder 500 and the movement information may be sent from the memory 502 to the encoder 500.

The encoder 500 receives the movement information about a movement of the camera 504, the movement information optionally being retrieved from the memory 502. The encoder 500 is arranged to encode, in real-time, a video stream acquired by the camera 504 during the movement of the camera 504. The encoder 500 is arranged to encode based on said movement information.

The encoder 500 may be implemented in software and executed by at least one processor in the encoder 500, for example by a central processing unit (CPU) and/or a graphical processing unit (GPU) of the encoder 500. For that purpose, the encoder may comprise a (non-transitory) computer-readable medium arranged to store computer code instructions which, when carried out by the CPU/GPU, implements the encoding methods described herein.

The encoder for real-time encoding may also be referred to as a real-time encoding encoder.

Figure 6:
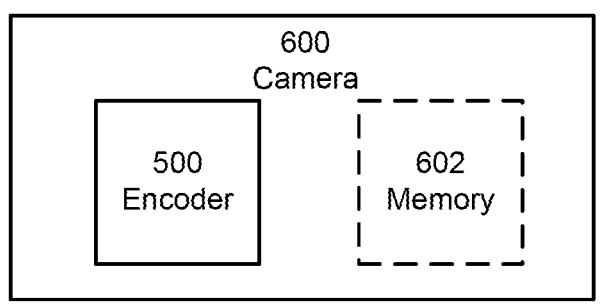
FIG. 6 is a schematic illustration of an embodiment of the inventive camera.

FIG. 6 is a schematic illustration of an embodiment of the inventive camera for real-time encoding. Here, the encoder 500 is arranged in the camera 600.

The camera 600 optionally comprises a memory 602 which is arranged to store movement information. As an alternative, the memory 602 may be arranged external to the camera 600 and the movement information may be sent from the memory 602 to the camera 600.

The encoder 500 receives the movement information about a movement of the camera 600, the movement information optionally being retrieved from the memory 602. The encoder 500 is arranged to encode, in real-time, a video stream acquired by the camera 600 during the movement of the camera 600. The encoder 200 is arranged to encode based on said movement information.

Figure 7:
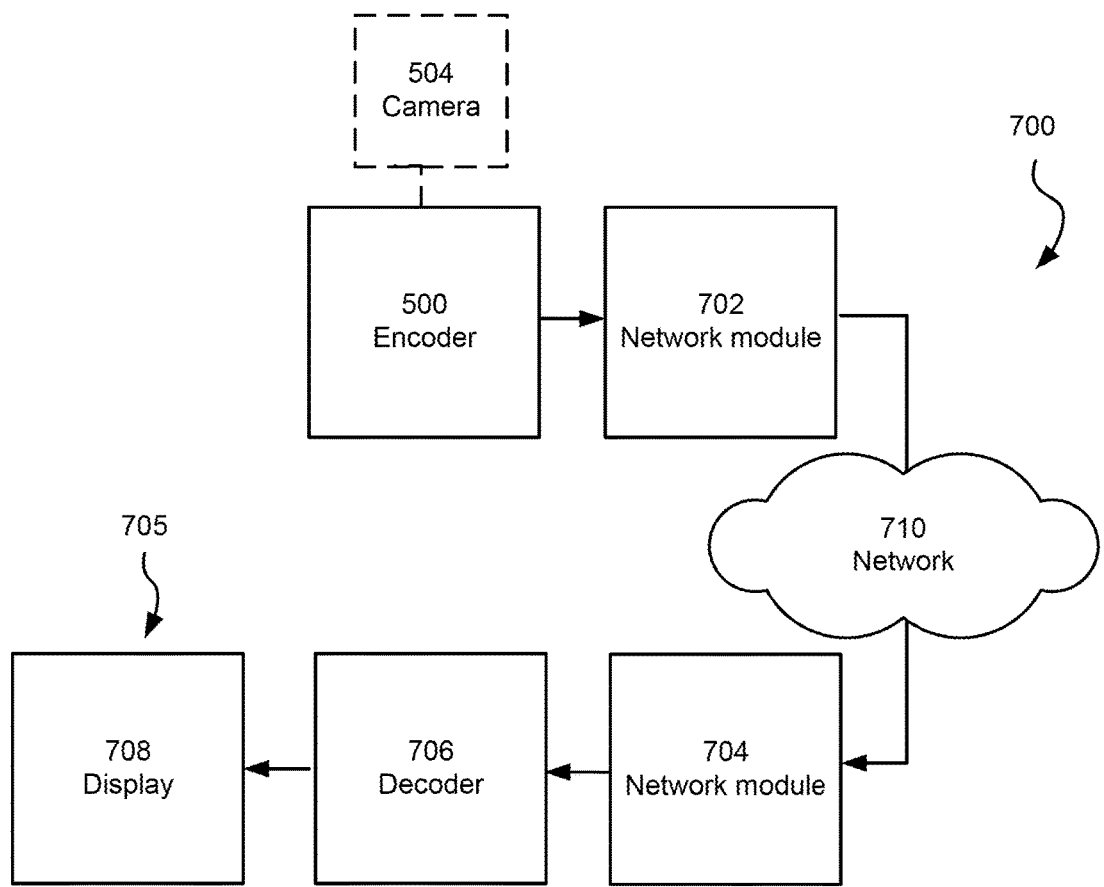
FIG. 7 is a schematic illustration of the inventive system.

FIG. 7 is a schematic illustration of the inventive system comprising the encoder for real-time encoding 500 described in FIG. 5. Optionally, the encoder 500 is connected to the camera 504. The system 700 may comprise the camera 504. As an alternative, the encoder is arranged in the camera as described in connection with FIG. 6. The encoder 500 encodes in real-time a video stream received from the camera 504. This results in an encoded video stream.

The system 700 further comprises a first digital network module 702 configured to transmit the encoded video stream via a digital network. The digital network module 702 may be part of the encoder 500 or implemented in a separate device. The encoded video stream is then transmitted to a second digital network module 704 configured to receive the encoded video stream via the digital network 710. The digital network module 704 may be part of the encoder 500 or implemented in a separate device.

The system 700 comprises a decoder 706 configured to decode the encoded video stream into a second video stream. The system 700 further comprises a client 705 which comprises a display 708 configured to display the second video stream. As an alternative, the client 705 may comprise the digital network module 704 and the decoder 706.

The movement of the camera may be controlled by a user instructing the camera to move. The user may, e.g., input instructions into a user interface connected to the camera. Various implementations of how this can be realized exist and are known to the person skilled in the art.

Alternatively, a control unit is arranged to control the camera. The control unit may then send movement instructions to the camera.

The control unit and/or the interface may be part of the system.

It is to be noted that all embodiments and features described in this application are applicable on all aspects of the invention.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for encoding a video stream including image frames acquired by a camera during a movement of the camera, comprising:

receiving, before the start of the movement of the camera, from a memory storing predetermined movement information, the predetermined movement information including information about the movement of the camera in a preprogrammed guard tour comprising a predetermined movement pattern between predetermined points at predetermined times, wherein the movement of the camera includes at least one of a pan operation and a tilt operation, wherein the predetermined movement information further comprises a predetermined duration including a start time and an end time of the movement of the camera between each of the predetermined points in the predetermined pattern; and encoding the image frames of the video stream acquired by the camera in real-time during the movement of the camera in the predetermined movement pattern using a temporarily adjusted ratio of inter frames to intra frames in the encoded video stream during the predetermined duration between the start time and the end time of the movement of the camera, wherein the temporarily adjusted ratio comprises a fixed encoding compensation, wherein the encoding uses the temporarily adjusted ratio during the predetermined duration between the start time and the end time of the movement of the camera.

2. The method according to claim 1, wherein the encoding comprises adjusting said ratio by reducing a number of intra frames at least during the movement.

3. The method according to claim 1, wherein adjusting comprises encoding using only inter frames at least during the movement.

4. The method according to claim 1, wherein the encoding comprises adjusting said ratio by increasing a number of intra frames during the movement.

5. An article of manufacture including a non-transitory computer-readable storage medium having instructions stored thereon for encoding a video stream including image frames that when executed by a computing device causes the computing device to perform operations comprising:

receiving, before the start of the movement of the camera, from a memory storing predetermined movement information, the predetermined movement information including information about the movement of the camera in a preprogrammed guard tour comprising a predetermined movement pattern between predetermined points at predetermined times, wherein the movement of the camera includes at least one of a pan operation and a tilt operation, wherein the predetermined movement information further comprises a predetermined duration including a start time and an end time of the movement of the camera between each of the predetermined points in the predetermined pattern; and encoding the image frames of the video stream acquired by the camera in real-time during the movement of the camera in the predetermined movement pattern using a temporarily adjusted ratio of inter frames to intra frames in the encoded video stream during the predetermined duration between the start time and the end time of the movement of the camera, wherein the temporarily adjusted ratio comprises a fixed encoding compensation, wherein the encoding uses the temporarily adjusted ratio during the predetermined duration between the start time and the end time of the movement of the camera.

6. An encoder for encoding a video stream including image frames acquired by a camera during a movement of the camera, comprising:

the encoder being configured to receive, before the start of the movement of the camera, from a memory storing predetermined movement information, the predetermined movement information including information about, the movement of the camera in a preprogrammed guard tour comprising a predetermined movement pattern between predetermined points at predetermined times, wherein the movement of the camera includes at least one of a pan operation and a tilt operation, wherein the predetermined movement information further comprises a predetermined duration including a start time and an end time of the movement of the camera between each of the predetermined points in the predetermined pattern; and the encoder being configured to encode the image frames of the video stream acquired by the camera in the predetermined movement pattern in real-time during the movement of the camera using a temporarily adjusted ratio of inter frames to intra frames in the encoded video stream during the predetermined duration between the start time and the end time of the movement of the camera, wherein the temporarily adjusted ratio comprises a fixed encoding compensation, wherein the encoder is arranged to encode using the temporarily adjusted ratio during the predetermined duration between the start time and the end time of the movement of the camera.

7. The encoder according to claim 6, wherein the encoder is configured to adjust said ratio by reducing a number of intra frames at least during the movement.

8. The encoder according to claim 6, wherein the encoder is configured to encode using only inter frames at least during the movement.

9. The encoder according to claim 6, wherein the encoder is configured to adjust said ratio by increasing a number of intra frames during the movement.

10. A digital video camera comprising:

a camera being configured to acquire a video stream including image frames during a movement of the camera;

an encoder being configured to receive, before the start of the movement of the camera, from a memory storing predetermined movement information, the predetermined movement information including information about, the movement of the camera in a preprogrammed guard tour comprising a predetermined movement pattern between predetermined points at predetermined times, wherein the movement of the camera includes at least one of a pan operation and a tilt operation, wherein the predetermined movement information further comprises a predetermined duration including a start time and an end time of the movement of the camera between each of the predetermined points in the predetermined pattern; and the encoder being configured to encode the image frames of the video stream acquired by the camera in real-time during the movement of the camera in the predetermined movement pattern using a temporarily adjusted ratio of inter frames to intra frames in the encoded video stream during the predetermined duration between the start time and the end time of the movement of the camera, wherein the temporarily adjusted ratio comprises a fixed encoding compensation, wherein the encoder is arranged to encode using the temporarily adjusted ratio during the predetermined duration between the start time and the end time of the movement of the camera.

11. A system comprising:

a camera configured to acquire a video stream including image frames during a movement of the camera;

an encoder being configured to:

receive, before the start of the movement of the camera, from a memory storing predetermined movement information, the predetermined movement information including information about the movement of the camera in a preprogrammed guard tour comprising a predetermined movement pattern between predetermined points at predetermined times, wherein the movement of the camera includes at least one of a pan operation and a tilt operation, wherein the predetermined movement information further comprises a predetermined duration including a start time and an end time of the movement of the camera between each of the predetermined points in the predetermined pattern;

encode the image frames of the video stream acquired by the camera in real-time during the movement of the camera in the predetermined movement pattern using a temporarily adjusted ratio of inter frames to intra frames in the encoded video stream during the predetermined duration between the start time and the end time of the movement of the camera, wherein the temporarily adjusted ratio is determined comprises a fixed encoding compensation, wherein the encoder is arranged to encode using the temporarily adjusted ratio during the predetermined duration between the start time and the end time of the movement of the camera; and transmit the encoded video stream via a digital network;

a decoder configured to receive the encoded video and decode the encoded video stream into a second video stream; and a client comprising a display configured to display the second video stream.

12. The method of claim 1, wherein the fixed encoding compensation comprises:

a fixed encoding compensation applied both in the beginning and end of a movement of the camera.

13. The method of claim 1, wherein the fixed encoding compensation comprises:

adding at least one inter frame after an end time of the movement of the camera.

14. The method of claim 1, wherein the fixed encoding compensation comprises:

adding an intra frame at the start time of the movement and adding only inter frames after the start time of the movement of the camera.

15. The encoder of claim 6, wherein the fixed encoding compensation comprises:

a fixed encoding compensation applied both in the beginning and end of a movement of the camera.

16. The encoder of claim 6, wherein the fixed encoding compensation comprises:

adding at least one inter frame after an end time of the movement of the camera.

17. The encoder of claim 6, wherein the fixed encoding compensation comprises:

adding an intra frame at the start time of the movement and adding only inter frames after the start time of the movement of the camera.

* * * * *